United States Patent
Shimizu (10) Patent No.: US 7,072,751 B2
(45) Date of Patent: Jul. 4, 2006

(54) CONTROLLER FOR ELECTRIC AUTOMOBILE

(75) Inventor: Hiroshi Shimizu, Kamakura (JP)

(73) Assignee: Japan Science and Technology Corporation, Kawaguchi (JP)

(*) Notice: Subject to any disclaimer, the term of this patent is extended or adjusted under 35 U.S.C. 154(b) by 0 days.

(21) Appl. No.: 11/127,266

(22) Filed: May 12, 2005

(65) Prior Publication Data

US 2005/0206332 A1    Sep. 22, 2005

Related U.S. Application Data

(62) Division of application No. 10/450,254, filed as application No. PCT/JP01/09420 on Oct. 26, 2001, now Pat. No. 6,909,950.

(30) Foreign Application Priority Data

Dec. 18, 2000    (JP)    ............. 2000-384089

(51) Int. Cl.
*G06F 7/00*    (2006.01)
*G05B 9/02*    (2006.01)

(52) U.S. Cl. .............. 701/36; 701/29; 701/253; 340/3.43

(58) Field of Classification Search .......... 701/33, 701/36, 29, 48; 340/3.43, 3.44; 324/528
See application file for complete search history.

(56) References Cited

U.S. PATENT DOCUMENTS

| | | | |
|---|---|---|---|
| 4,451,054 A * | 5/1984 | Allison | ............ 280/104 |
| 5,369,584 A | 11/1994 | Kajiwara | |
| 5,481,906 A | 1/1996 | Nagayoshi et al. | |
| 5,586,034 A | 12/1996 | Takaba et al. | |
| 5,726,541 A | 3/1998 | Glenn et al. | |
| 5,941,925 A | 8/1999 | Hess et al. | |
| 6,201,316 B1 | 3/2001 | Knecht | |
| 6,223,104 B1 | 4/2001 | Kamen et al. | |
| 6,282,668 B1 | 8/2001 | Neudecker | |
| 6,360,152 B1 | 3/2002 | Ishibashi et al. | |
| 6,434,459 B1 | 8/2002 | Wong et al. | |
| 6,622,804 B1 | 9/2003 | Schmitz et al. | |
| 6,687,585 B1 | 2/2004 | Rizzoni et al. | |
| 6,766,230 B1 | 7/2004 | Rizzoni et al. | |
| 6,816,764 B1 | 11/2004 | Coelingh et al. | |
| 6,837,325 B1 * | 1/2005 | Shimizu | ............ 180/68.5 |
| 6,863,149 B1 * | 3/2005 | Shimizu | ............ 903/925 |
| 6,909,950 B1 * | 6/2005 | Shimizu | ............ 701/36 |
| 7,006,902 B1 * | 2/2006 | Archer et al. | ............ 701/36 |

FOREIGN PATENT DOCUMENTS

| | | |
|---|---|---|
| EP | 1006694 | 6/2000 |
| JP | 1-164203 | 6/1989 |
| JP | 1-164204 | 6/1989 |
| JP | 2000-156903 | 6/2000 |

* cited by examiner

*Primary Examiner*—Marlon T. Fletcher
*Assistant Examiner*—Eduardo Colon Santana
(74) *Attorney, Agent, or Firm*—Oblon, Spivak, McClelland, Maier & Neustadt, P.C.

(57) ABSTRACT

A control device of an electric car in which any two of control devices fixed to the corresponding electric motors send signals to each other and send and receive control information by taking a bypass route when any one of transmission lines malfunctions is provided.

Fail safe means for signal transmission lines, in which a bypass route is established such that a node detecting a communication failure in an electronic control system of the car sends a search message for searching a transmission route and another node which is able to establish the transmission route sends back a response message, is provided.

6 Claims, 7 Drawing Sheets

CONTROLLER FOR ELECTRIC AUTOMOBILE

CROSS-REFERENCE TO RELATED APPLICATIONS

This application is a divisional application of, and claims priority to, Ser. No. 10/450,254 filed Jun. 12, 2003 now U.S. Pat. No. 6,909,950 which is the National Stage of PCT/JP01/09420 filed Oct. 26, 2001 each of which claim priority to JP 2000-384089 filed Dec. 18, 2000.

TECHNICAL FIELD

The present invention relates to a control device of an electric car having fail-safe means in its electronic control system.

BACKGROUND ART

There is an urgent need to develop a totally electric car as one of decisive factors in preventing air pollution due to motorization. With the understanding that conservation of the natural environment is a big issue in the 21st century, the inventor of the present invention started the development in 1980s and is now yielding results.

Figure 1:
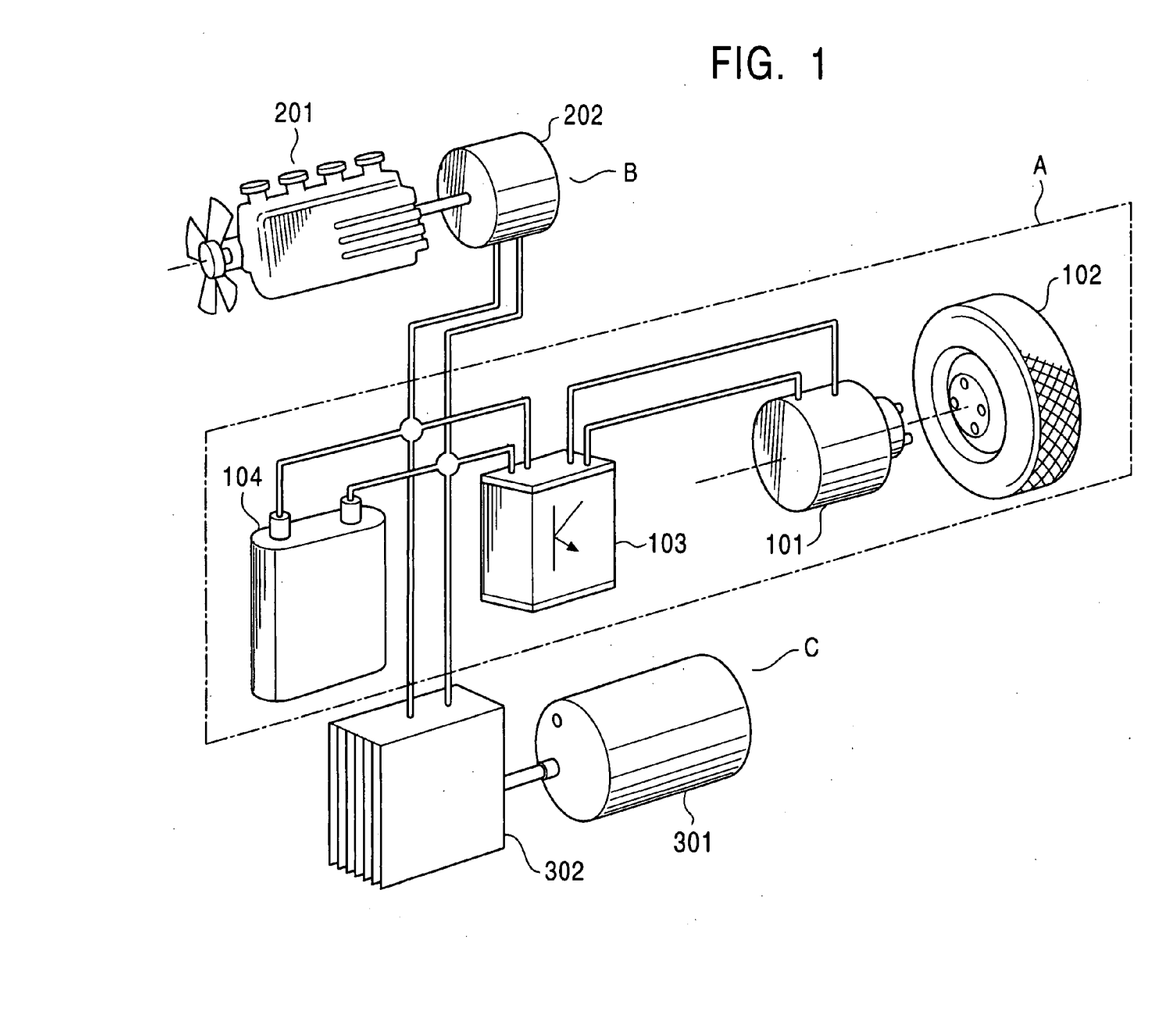
FIG. 1 illustrates the basic structure of an electrically powered car.

As shown in FIG. 1, an electric car is driven by using only a driving force of an electric motor 101. When a secondary battery, an engine generator, or a fuel battery is used as a power source for the electric motor 101, the electric car is respectively referred to as an electric car A in the narrow sense, a series hybrid car B, or a fuel battery car C. The reference numerals 102, 103, 104, 201, 202, 301, and 302 respectively denote a wheel, a controller, a secondary battery, an engine, a generator, a hydrogen feeding source, and a fuel battery.

As mentioned above, since the electric car is driven by using only a driving force of a rotary electric motor, it is defined as a car which uses a secondary battery, a fuel battery, a generator using an internal-combustion engine, a solar battery, or the like, or a combination of at least two of them, as a power source for the electric motor. Although the electric car uses only a secondary battery in the following description, those skilled in the art will appreciate that the present invention is applicable to a car which uses a fuel battery, a generator using an internal-combustion engine, or a solar battery as a power source.

In order to improve the safety and the ease of use of a car in driving, an electronic system essential for the safety of the car has been increasingly equipped with redundant components such as sensors and computing elements.

In a disclosed example, position sensors of an operating member which can be operated by a driver, sensors for detecting the number of revolutions, or the like are redundantly provided. A signal from a measuring device having such a redundant structure is fed to two processors, each controlling a driving output of a car in accordance with substantially the same computer program as that of the other. Output signals from the two processors act on a common variable which affects an output of a driving unit.

However, if this type of system is made fully redundant, it becomes very complicated, resulting in an increased cost and an increased frequency of failures.

As is well known, a present car is equipped with a plurality of electronic control units, in particular, including a speed control unit and a steering control unit. Each of these control units acts on another variable of a driving unit of the car.

In the present car, these control units are mutually connected to each other by an electronic connecting system and mutually exchange data and information therethrough.

Although a speed control of the electric car is performed by feeding an electrical signal from an accelerator pedal to a control device for controlling an electric current to be applied to its electric motor, when a plurality of electric motors are used to drive the car and also when an acceleration, a deceleration, and a turning angle of the car are controlled, an additional central control device for controlling the overall car is required. In such control devices, the central control device and each of the control devices fixed to the corresponding electric motors have been connected by a corresponding signal line so as to perform a control.

DISCLOSURE OF INVENTION

However, in such a control method, when one of transmission lines malfunctions, it becomes impossible to control a corresponding electric motor.

In view of the above-mentioned circumstances, an object of the present invention is to provide a control device of an electric car in which any two of control devices fixed to the corresponding electric motors send signals to each other and send and receive control information by taking a bypass route when any one of transmission lines malfunctions.

In order to achieve the above object,

[1] the present invention provides a control device of an electric car including a plurality of driving wheels, each having a drive motor fixed thereto, which includes a plurality of speed control devices, each fixed to the corresponding drive motor for accelerating or decelerating the corresponding drive wheel in accordance with an external electrical signal, and which includes a main control device having functions of sending a control signal, to each of the speed control devices, for performing an acceleration or deceleration in accordance with a command from a driver or at least one of on-board sensors, and also receiving a control signal including information of an operating state of each of the drive motors and the speed control devices.

[2] In the control device of an electric car set forth in the above [1], a voltage of a battery, a current fed from the battery, and a battery temperature are included as sensor signals which are input into the main control device.

[3] In the control device of an electric car set forth in the above [1], a steering-angle of a steering wheel is included as a sensor signal which is input into the main control device.

[4] In the control device of an electric car set forth in the above [1], a signal indicating that a battery is being recharged from a battery charger is included as a sensor signal which is input into the main control device.

[5] In the control device of an electric car set forth in the above [1], signals representing a brake command value from a brake controller and a hydraulic pressure of a master cylinder are included as sensor signals which are input into the main control device.

[6] In the control device of an electric car set forth in the above [1], a steering-angle signal of a steering wheel is included as a control signal sent from the main control device.

[7] Also, the present invention provides a control device of an electric car, which includes fail safe means for signal transmission lines, wherein a bypass route is established such that a node detecting a communication failure in an electronic control system of the car sends a search message for searching a transmission route and another node which is able to establish the transmission route sends back a response message.

[8] In the control device of an electric car set forth in the above [7], each of the nodes includes self-node-ID storing means for storing its own node identifier, adjacent-node-ID storing means for storing identifiers of adjacent nodes connected to the transmission route, and processing means for processing route setting on the basis of a message sent to the node.

[9] In the control device of an electric car set forth in the above [8], the node is provided at each of a car controller and motor controllers, each provided at a pair of driving wheels.

[10] In the control device of an electric car set forth in the above [8], the node is provided at each of a battery controller, a steering controller, a brake controller, and a battery charging controller.

[11] In the control device of an electric car set forth in the above [9], the car controller and the motor controllers, each provided at a pair of driving wheels, control corresponding power converters in accordance with control signals received via the corresponding nodes.

[12] In the control device of an electric car set forth in the above [9] or [10], the bypass route is established by a control-signal-use, alternative main transmission line forming a closed loop and alternative transmission lines connecting the alternative main transmission line and the motor controllers.

[13] In the control device of an electric car set forth in the above [12], when a certain node detects that all communication lines and bypass routes to the car controller malfunction, the node stops an operation of the corresponding motor controller, and the car controller detects that there is no response from the certain node and hence separates the motor controller of the certain node from its control objects.

BEST MODE FOR CARRYING OUT THE INVENTION

A control device according to an embodiment of the present invention will be described with reference to the accompanying drawings. The control device controlling individual motors so as to improve the running stability of the vehicle under slipping is equipped with a fail safe mechanism and is mounted on an example electric car having a wheel configuration system in which each pair of two wheels are suspended by a tandem wheel suspension and having six or more drive wheels, each wheel formed so as to be equipped with an in-wheel drive system.

Since the present invention is characterized by fail safe means in a control system including an electronic control unit, other control systems and devices are applied if needed.

(1) System Configuration

Figure 2:
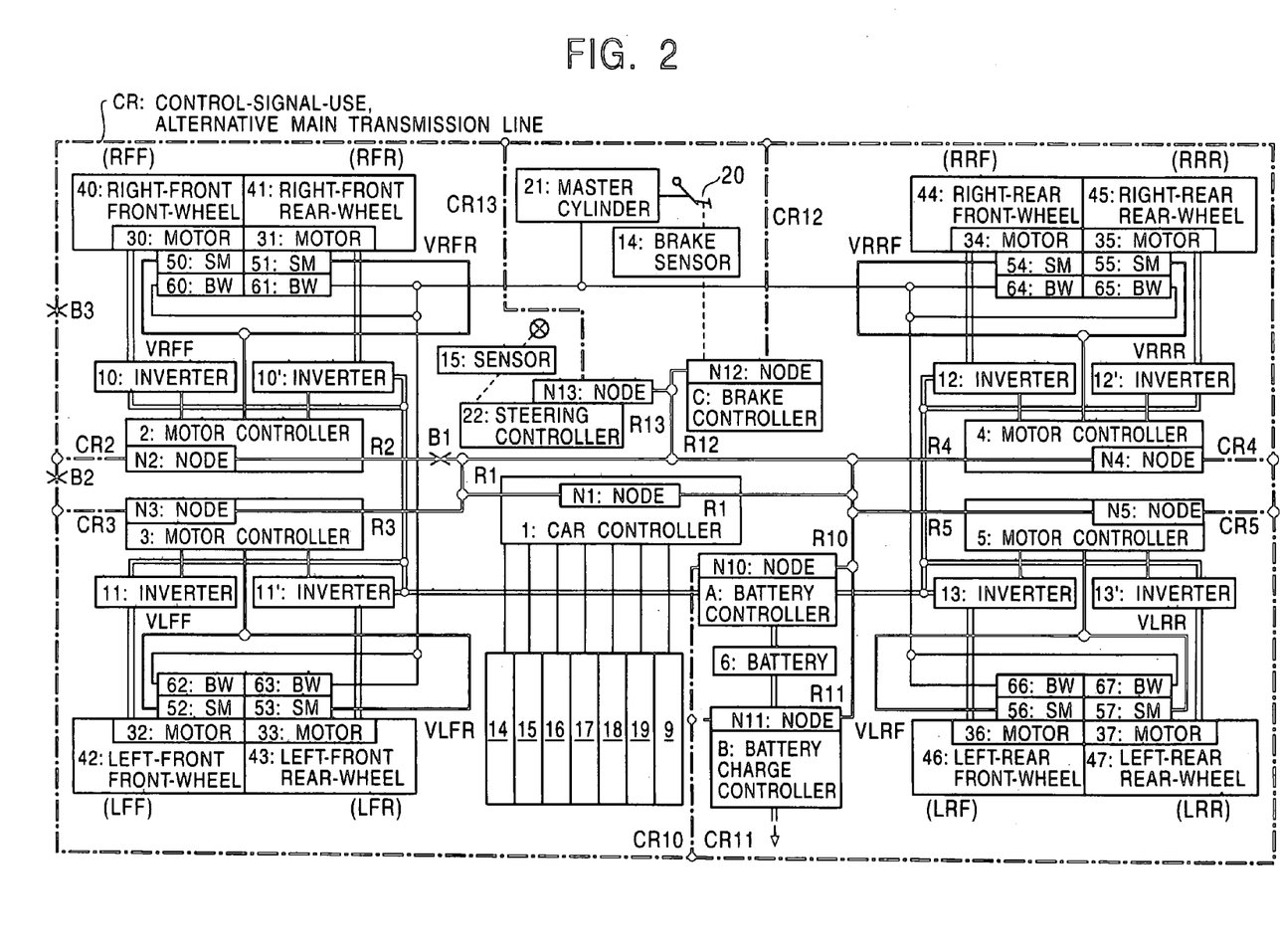
FIG. 2 illustrates a system configuration of an electric car according to an embodiment of the present invention.

FIG. 2 illustrates a system configuration of an electric car according to an embodiment of the present invention.

In the present invention, a wheel system in which all pairs of two front and rear wheels are suspended by a tandem wheel suspension is not always required, and another wheel system in which only two pairs of front or rear wheels are suspended by the corresponding tandem wheel suspension may be used.

The electric car according to this embodiment is of an in-wheel-motor, eight-wheel-drive type. That is, the electric car has a wheel system suspended by the tandem wheel suspension and has an in-wheel drive system in which all wheels have respective motors incorporated therein.

Since this configuration allows each wheel to bear a reduced load, a TRC or ABS control is performed so as to be commensurate with the reduction in load, whereby a risk of slipping or the like can be reduced and the running stability can be improved.

Each motor can be driven by one of a variety of power sources which feed, for example, an alternating current, a direct current, and a pulse current, by using corresponding power converters, that is, an inverter, a converter, and a chopper, respectively.

The system configuration in which an alternating-current power source and inverters serving as power converters are used will be now described.

A car controller 1 equipped with a micro-computer receives detection information from a variety of sensors; processes the information as needed and outputs a control command to each of motor controllers 2, 3, 4, and 5. The control command from the car controller 1 is output to each of the motor controllers 2, 3, 4, and 5, a battery controller A, a battery charging controller B, a brake controller C, and a steering controller 22 via transmission lines R1, R2, R3, R4, R5, R10, R11, R12, and R13, alternative transmission lines CR2, CR3, CR4, CR5, CR10, CR11, CR12, and CR13, and a control-signal-use, alternative main transmission line CR.

Also, the car controller 1 is equipped with an electronic control unit (ECU) for controlling an output torque, the number of revolutions, and a speed of each of motors 30, 31, 32, 33, 34, 35, 36, and 37; monitoring and controlling the status of each of on-board components; informing a driver of the status of the car; controlling the feeding of a battery, the charging of the battery, a brake, and a steering mechanism; and performing other functions, and has a processing microprogram for performing the foregoing functions. In addition, detected outputs of rotating position sensors (speed sensors) (SM) 50, 51, 52, 53, 54, 55, 56 and 57; a power sensor 9 for detecting a voltage and/or a current of the battery; a brake sensor 14 for detecting an operation of the brake; a steering-angle sensor 15 for detecting a steering angle of a steering wheel; a shift position (SP) switch 16 for detecting a shift position of a shift lever; an accelerator sensor 17 for detecting an opening of an accelerator; temperature sensors 18 for detecting temperatures of the battery, inverters, and the like; and malfunction-detecting sensors 19 for detecting the fact that a voltage and/or a current of each inverter become smaller than a threshold and the like are input into the car controller 1.

The speed sensors (for example, resolvers) 50, 51, 52, 53, 54, 55, 56 and 57 attached to the corresponding wheels generate signals (for example, pulse signals at every fine angular positional displacement) representing wheel speeds VRFF, VRFR, VLFF, VLFR, VRRF, VRRR, VLRF, and VLRR of the corresponding wheels and feed them to the car controller 1.

The accelerator sensor 17, the brake sensor 14, and the shift position switch 16 output signals respectively representing the depressed amount of a accelerator pedal. (not shown), the depressed amount of a brake pedal 20, and a throwing range of the shift lever (not shown) (and a shift lever position in a range of engine-braking or the like), that is, a shift position. The steering-angle sensor 15 outputs a signal such as a steering angle δt, representing the detected result of a steering angle of the steering wheel. The power sensor 9 of the battery 6 measures and outputs a voltage and/or a current of the battery 6. Each temperature sensor 18 measures and outputs a temperature of equipment such as an inverter. Each malfunction-detecting sensor 19 outputs a malfunction signal when a voltage and/or a current of each converter become equal to or smaller than a threshold.

When being input into the car controller 1, each of outputs of these sensors is converted into data in a processable format by the car controller 1. Using the converted data, the car controller 1 decides command values of a torque, the number of revolutions, a vehicle speed, and so forth, changes over a control method, and performs others. A system configuration for performing a torque control will be now described by way of example.

The motor controllers 2, 3, 4, and 5 equipped with respective micro-computers receive control commands from the car controller 1 via the transmission lines, process the control commands as needed, and output the processed control commands to corresponding pairs of inverters 10 and 10', 11 and 11', 12 and 12', and 13 and 13'. In accordance with torque command values TRF, TLF, TRR, and TLR, the motor controllers 2, 3, 4, and 5 control the corresponding pairs of inverters 10 and 10', 11 and 11', 12 and 12', and 13 and 13' so as to perform torque controls of corresponding pairs of motors 30 and 31, 32 and 33, 34 and 35, and 36 and 37. All the torque command values provided to the motor controllers 2, 3, 4, and 5 are output from the car controller 1. Each of the inverters 10, 10', 11, 11', 12, 12', 13, and 13', respectively, for the motors 30, 31, 32, 33, 34, 35, 36, and 37 is controlled on the basis of detected phase currents of the corresponding motor obtained from current sensors (not shown) or on the basis of estimated phase currents of the corresponding motor computed from an angular position of its rotor or the like.

The wheel system suspended by the tandem wheel suspension includes a right-front front-wheel RFF40, a right-front rear-wheel RFR41, a left-front front-wheel LFF42, a left-front rear-wheel LFR43, a right-rear front-wheel RRF44, a right-rear rear-wheel RRR45, a left-rear front-wheel LRF46, and a left-rear rear-wheel LRR47 having the motors 30, 31, 32, 33, 34, 35, 36, and 37 respectively incorporated thereinto.

The battery 6 serves as a driving power source to each motor, and its output is fed to the motors 30 and 31 via the inverters 10 and 10', the motors 32 and 33 via the inverters 11 and 11', the motors 34 and 35 via the inverters 12 and 12', the motors 36 and 37 via the inverters 13 and 13', respectively. Under the control of the motor controller 2 controlled by the car controller 1, the inverters 10 and 10' convert the output power of the battery 6 (in this figure, into a power of three-phase alternating current) and feed it to the corresponding motors 30 and 31 in order to control their torques, speeds, and so forth. The inverters 11, 11', 12, 12', 13, and 13' operate likewise.

A brake system for putting brake on each of front and rear, right and left tandem wheels with both hydraulic and a regenerating brakes is used in FIG. 2 under the design policy of maintaining the safety of the car.

More particularly, when the brake pedal 20 is depressed, a hydraulic pressure generated in a master cylinder 21 in accordance with the above depression acts on brake wheels BW60, BW61, BW62, BW63, BW64, BW65, BW66, and BW67 via respective wheel cylinders fixed to the corresponding wheels so as to provide brake torques to the wheels.

On the other hand, a detection signal in accordance with a brake force (a hydraulic pressure of the master cylinder 21) FB detected by the brake sensor 14 is input into the car controller 1 over the transmission line R12 via a node N12, and the car controller 1 generates the torque command values TRF, TLF, TRR, and TLR for performing the regenerating brake in accordance with the foregoing detection signal. A command value in accordance with the control command such as a torque command value or a speed command value serves as a regeneration command value.

Accordingly, a brake force distribution in the car shown in FIG. 2 increases in both the hydraulic brake and the regenerating brake as the brake force FB increases. As mentioned above, since a hydraulic system and a regeneration system are separated down from the brake sensor 14 and are also backed up by the transmission lines, even when any one of the hydraulic and regenerating brakes malfunctions, the other can save the car.

In addition, since a hydraulic pump used for a TRC/ABS control is not installed in the hydraulic system and only a proportioning valve for making the front and rear distribution of the hydraulic brake force proper is installed, the structure of a hydraulic brake system becomes simple. One of the reasons for eliminating the hydraulic pump and the hydraulic device for performing the TRC/ABS control from the hydraulic system is the configuration of this embodiment characterized in that the running stability of the vehicle is controlled by utilizing controls of output torques of motors.

The fail safe mechanism characterized by this invention includes the control-signal-use, alternative main transmission line CR forming a closed loop; the alternative transmission lines CR2, CR3, CR4, CR5, CR10, CR11, CR12, and CR13 for connecting from the alternative main transmission line CR, respectively, to the motor controllers 2, 3, 4, and 5, the battery controller A, the battery charging controller B, the brake controller C, and the steering controller 22; the motor controllers 2, 3, 4, and 5; the battery controller A; the battery charging controller B; the brake controller C; the steering controller 22; the car controller 1 for performing an overall control; and the transmission lines for connecting each of the motor controllers, the battery controller A, the battery charging controller B, the brake controller C, and the steering controller 22 to the car controller 1.

(2) Basic Control of Car

Figure 7:
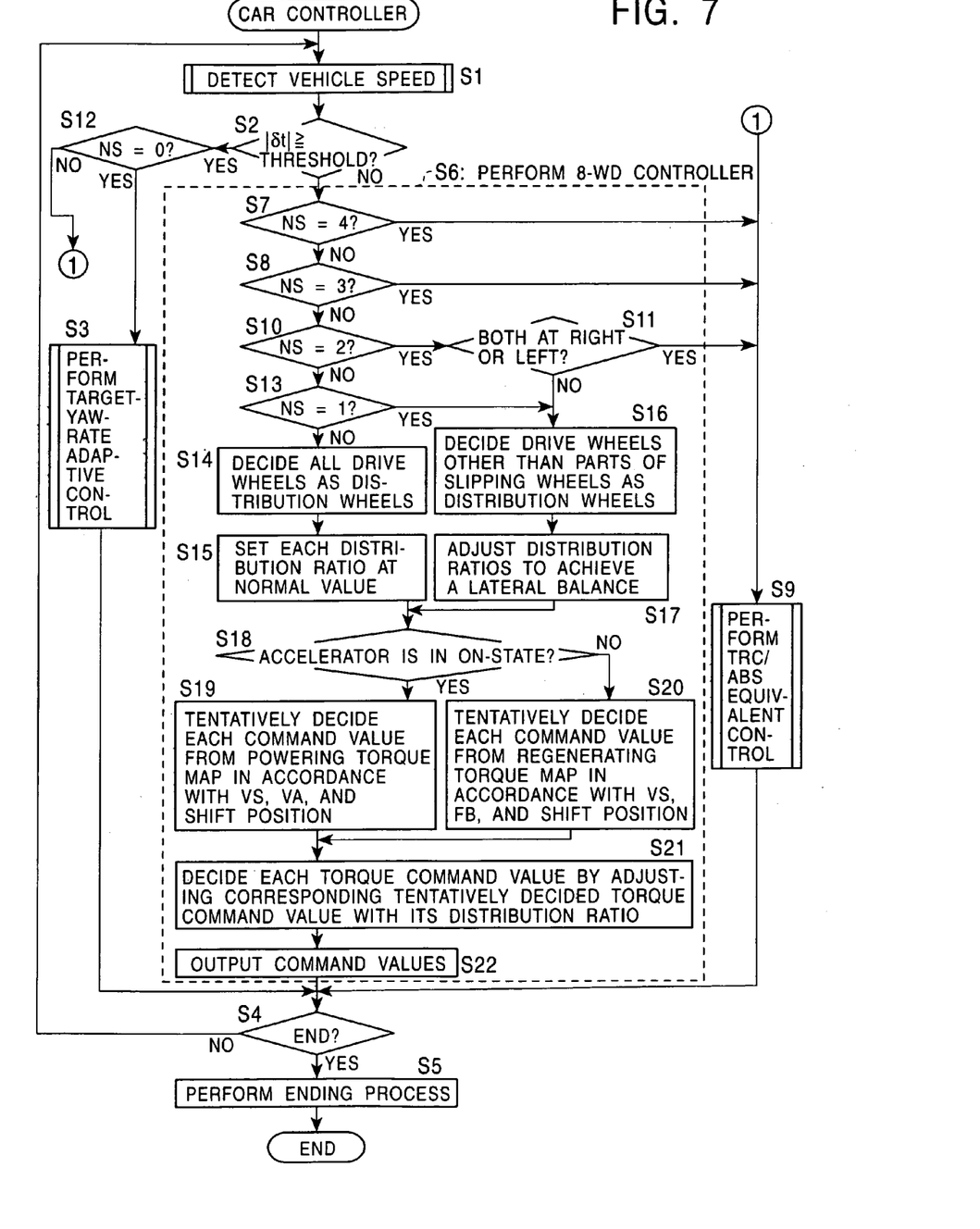
FIG. 7 is a flowchart illustrating an operation sequence of a car controller according to the embodiment of the present invention.

FIG. 7 is a flowchart of an operation sequence of the car controller according to the embodiment of the present invention.

First, the car controller 1 detects a vehicle speed VS (Step S1).

Figure 4:
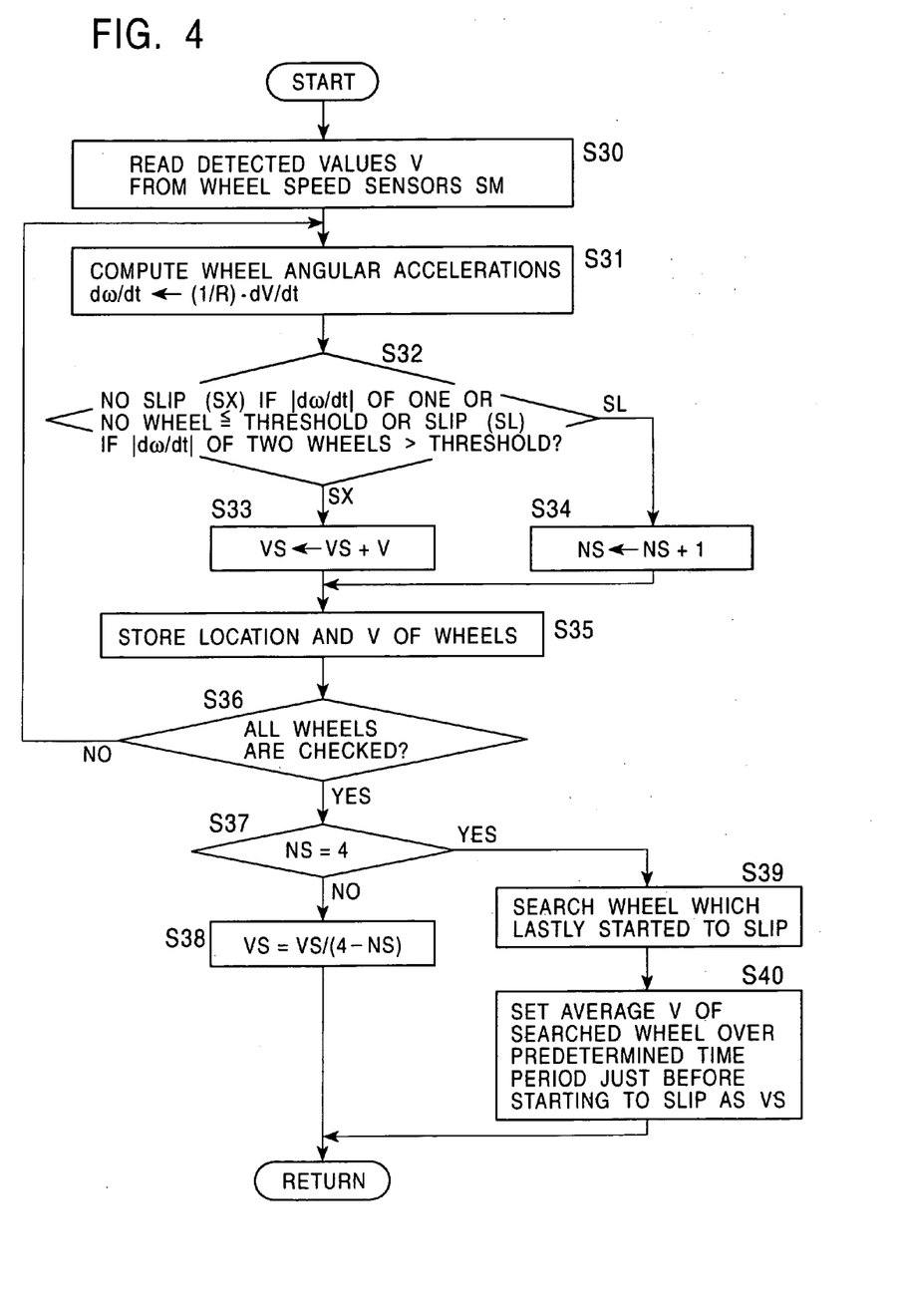
FIG. 4 is a flowchart illustrating the steps of detecting a vehicle speed according to the embodiment of the present invention.

Although a variety of sequences for detecting the vehicle speed VS can be employed, an example sequence shown in FIG. 4 is preferably employed. In the following description, a sequence for detecting the vehicle speed VS is shown by a flowchart shown in FIG. 4. In this figure, the car controller 1 reads detected values V of the wheel speed sensors (SM) for a pair of two tandem-structured wheels (Step S30), and computes wheel angular-accelerations $d\omega/dt$ (Step S31). The following expression can be used for computing a wheel angular-acceleration:

$$d\omega/dt \leftarrow (1/R) \times dV/dt$$

where R is a radius of a wheel, and V and $\omega$ is respectively a wheel speed and a wheel angular-velocity of the wheel whose angular acceleration is to be computed.

The car controller 1 compares the absolute values of the above-computed wheel angular-accelerations $d\omega/dt$ of the foregoing one pair with a predetermined threshold. When the absolute values of the pair of two wheels (i.e., all two wheels) exceed the predetermined threshold, the car controller 1 determines that a slip (SL) occurs; when the absolute value of one of the pair of wheels exceeds the threshold and that of the other wheel does not exceed it, the car controller 1 determines that no slip (SX) occurs and also holds the wheel speed V of the other wheel as a wheel speed of the pair; and when the absolute values of the wheel angular-accelerations $d\omega/dt$ of the pair of two wheels (i.e., all two wheels) do not exceed the predetermined threshold, the car controller 1 determines that no slip (SX) occurs and also holds the larger one of the wheel speeds as a wheel speed of the pair (Step S32).

When the car controller 1 determines that no slip (SX) occurs at the pair of wheels, the wheel speed V of the wheels is added to a variable VS (Step S33). Meanwhile, when the car controller 1 determines that a slip occurs at the pair of wheels, since it is considered that a slip occurs or is likely to occur because the absolute values of the angular accelerations $d\omega/dt$ exceed the predetermined threshold, a variable NS for counting the number of pairs of wheels which are considered to slip or to be likely to slip (slipping wheels) is incremented by 1 (Step S34).

Upon carrying out Step S33 or S34, the car controller 1 stores the location and the wheel speed V of the pair of wheels in a memory or the like (Step S35). The car controller 1 applies the sequence from Step S31 to S35 to all drive wheels including all tandem-structured wheels (Step S36).

Upon determining whether each pair of all drive wheels are slipping wheels or non-slipping wheels, the car controller 1 determines whether the number NS of pairs of slipping wheels is equal to 4 or not, that is, whether all drive wheels slip or not (Step S37). Since all drive wheels do not usually slip or are likely to slip at the same time, the car controller 1 computes the vehicle speed VS by dividing the value VS accumulated in repeatedly carried out Step S33 by (4−NS), that is, the number of pairs of non-slipping wheels (Step S38).

Meanwhile, when the relationship NS=4 holds, the car controller 1 searches which drive wheel has started lastly to slip by using the information stored when Step S35 was carried out (Step S39).

The car controller 1 sets the wheel speed V maintained by the drive wheel just before starting to slip, which was found by the above search, that is, which has started lastly to slip, as the vehicle speed VS (Step S40).

As described above, in this embodiment, the vehicle speed VS can be relatively accurately decided by computing the vehicle speed VS, in principle, only from the wheel speeds of non-slipping wheels, whereby a torque command value tentatively decided in a sequence, which will be mentioned later, becomes proper. Also, with the tandem suspension structure, all the eight wheels rarely slip or are almost unlikely to slip. Even when the above-mentioned state happens, since the average wheel speed maintained by the wheel, which has started lastly to slip, over a predetermined time period just before starting to slip is set as the vehicle speed VS, relatively reliable information can be used for tentatively deciding the torque command value. Upon carrying out Step S38 or S40, the operation of the car controller 1 returns to Step S2 shown in FIG. 7.

In FIG. 7, upon detecting the vehicle speed VS, in order to assess the steering state, the car controller 1 first determines whether the absolute value of the steering angle $\delta t$ is equal to or greater than a predetermined threshold or not (Step S2). When the steering angle exceeds the threshold and no slip occurs (Step S12), the car controller 1 performs a target-yaw-rate adaptive control or a target-slip-angle adaptive control (for example, a zero slip-angle control) (Step S3).

For example, when the absolute value of the steering angle $\delta t$ detected by the steering-angle sensor 15 is equal to or greater than the predetermined threshold, that is, when it is determined that a driver is steering the car, the car controller 1 performs the target-yaw-rate adaptive control or the target-slip-angle adaptive control in order to prevent or suppress the driving instability of the vehicle caused by the steering.

Figure 5:
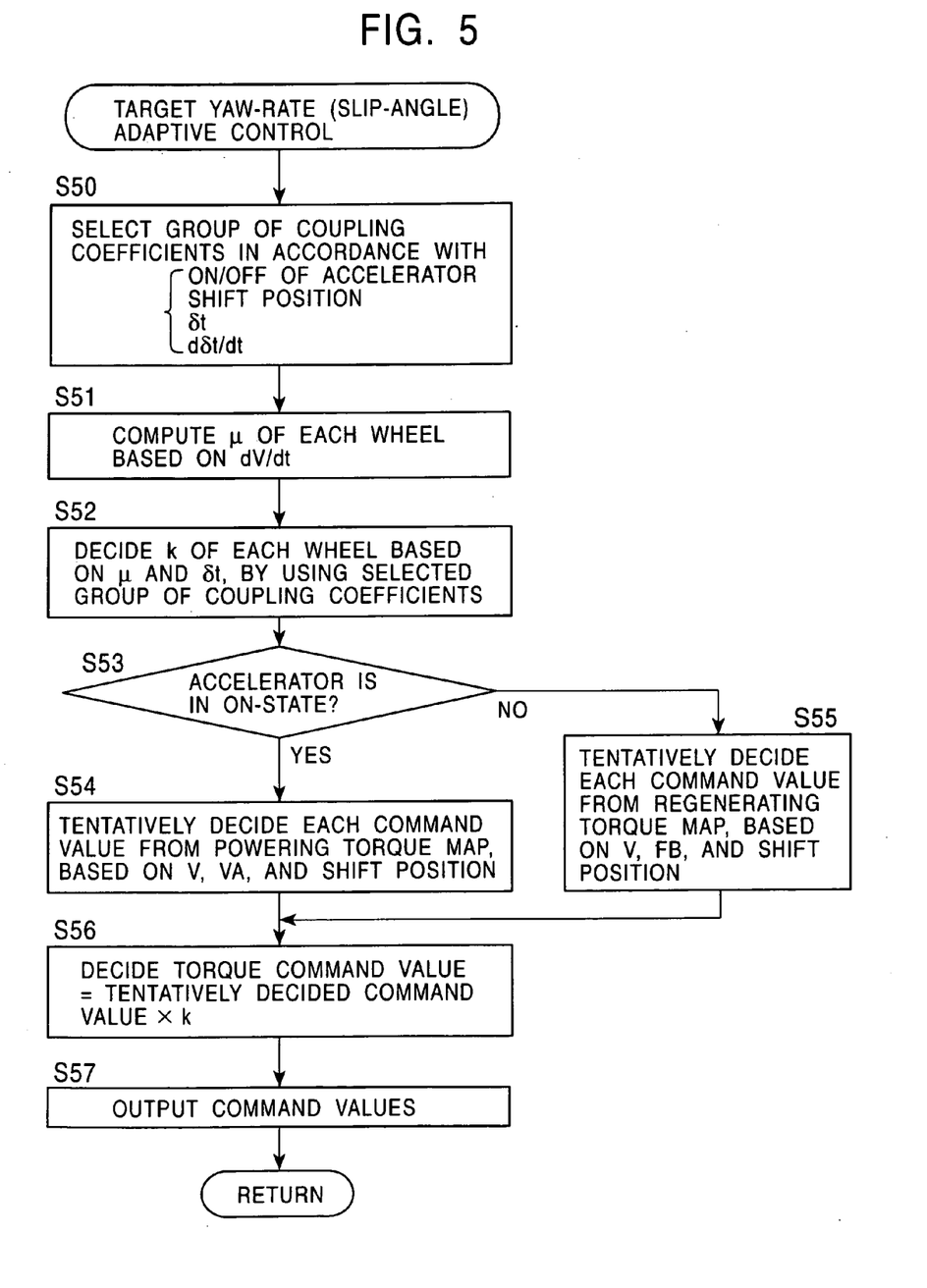
FIG. 5 is a flowchart illustrating the steps of a target-yaw-rate (target-slip-angle) adaptive control according to the embodiment of the present invention.

An example sequence of the target-yaw-rate adaptive control or the target-slip-angle adaptive control is shown in FIG. 5.

In a flow shown in FIG. 5, in accordance with an ON- or OFF-state of the accelerator determined on the basis of an output of the accelerator sensor 17, a shift position obtained by the shift position switch 16, a steering angle $\delta t$ provided by the steering-angle sensor 15, $d\delta/dt$ which can be computed on the basis of the steering angle $\delta t$, and so forth, the car controller 1 first selects a group of coupling coefficients (by using an experimental expression) (Step S50).

Furthermore, the car controller 1 computes a wheel acceleration $dV/dt$ of each wheel forming the tandem suspension structure and then computes a coefficient of road friction $\mu$ (by using another experimental expression) on the basis of the computed acceleration (Step S51). The car controller 1 decides a correction factor k of each wheel on the basis of the coefficient of road friction $\mu$ and the steering angle $\delta t$ and also by using the group of coupling coefficients selected in Step S50 (Step S52).

When the accelerator is in an ON-state (Step S53), the car controller 1 tentatively decides a torque command value of each wheel, from a powering torque map, on the basis of its wheel speed V, an accelerator opening VA, and the shift position (Step S54). Also, when the accelerator is in an OFF-state (Step S53), the car controller 1 tentatively decides a torque command value of each wheel, from a regenerating torque map, on the basis of its wheel speed V, the brake force FB, and the shift position (Step S55). The powering torque map shows a characteristic of the number of revolutions vs. torque where both the torque and the number of revolutions are positive, and the regenerating torque map shows a characteristic of the number of revolutions vs. torque where the number of revolutions is positive and the torque is negative. These torque maps are experimentally obtained in advance.

The car controller 1 decides a torque command value by multiplying the torque command value tentatively decided in Step S54, or S55 by the correction factor decided in Step S52 (Step S56) and outputs the decided torque command value to the corresponding motor controller (Step S57).

Accordingly, depending on methods for setting the group of coupling coefficients which are selected in Step S50 and the correction factors in Step S52, a torque command value in a range possible for performing the target-yaw-rate adaptive control or the target-slip-angle adaptive control can be in a regenerating region even when the accelerator is in an ON-state or can be in a powering region even when the accelerator is in an OFF-state. By performing the above-mentioned control, the running stability of the vehicle in steering is improved in this embodiment.

Refer the disclosure in Japanese Unexamined Patent Application Publication No. 10-210604 with regard to the target-yaw-rate adaptive control and the target-slip-angle adaptive control. Meanwhile, a method for performing the running stability control by using a plurality of state variables which include a yaw rate acting on the vehicle and which demonstrate the moving state of the car instead of the target-yaw-rate adaptive control or the target-slip-angle adaptive control may be employed.

Refer Japanese Unexamined Patent Application Publication No. 10-271613 with regard to this method. Upon completing the target-yaw-rate adaptive control or the target-slip-angle adaptive control, the operation of the car controller 1 returns to FIG. 7.

The operation of the car controller 1 returns to Step S1 so as to repeat itself. In Step S2 which is performed upon detecting the vehicle speed VS, when it is admitted that there is no need for performing the target-yaw-rate adaptive control or the target-slip-angle adaptive control, that is, when the absolute value of the steering angle is less than the threshold, in principle, the car controller 1 performs the sequence in association with an 8-WD control (Step S6).

When starting this 8-WD control Step S6, the car controller 1 first performs a determining and classifying process about the number NS of pairs of slipping wheels, each pair corresponding to one pair of slipping wheels forming the tandem suspension structure, detected in the sequence for detecting the vehicle speed VS.

In other words, when the number NS of pairs of the detected slipping wheels is equal to 4, that is, all the drive wheels slip or are likely to slip (Step S7) or when the number NS of pairs of the slipping wheels is 3, that is, when only one pair of the driving wheels forming the tandem suspension structure do not slip or are unlikely to slip (Step S8), the operation of the car controller 1 advances to a TRC/ABS equivalent control (Step S9), as opposed to advancing to the 8-WD control (Step S6).

Also, even when the number NS of pairs of the slipping wheel is 2, in other words, even when two pairs of the drive wheels forming the tandem suspension structure do not slip or are unlikely to slip (Step S10), the above operation advances to the TRC/ABS equivalent control (Step S9) when both pairs of the detected slipping wheels lie together at the left or at the right of the car (Step S11).

In addition, even when it is determined in the foregoing Step S2 that performing the target-yaw-rate adaptive control or the target-slip-angle adaptive control is likely necessary, the above operation advances also to the TRC/ABS equivalent control (Step S9) when the number NS of pairs of the slipping wheels is not zero, that is, when it is admitted that any one pair of the drive wheels forming the tandem suspension structure slip or are likely to slip (Step S12).

Figure 6:
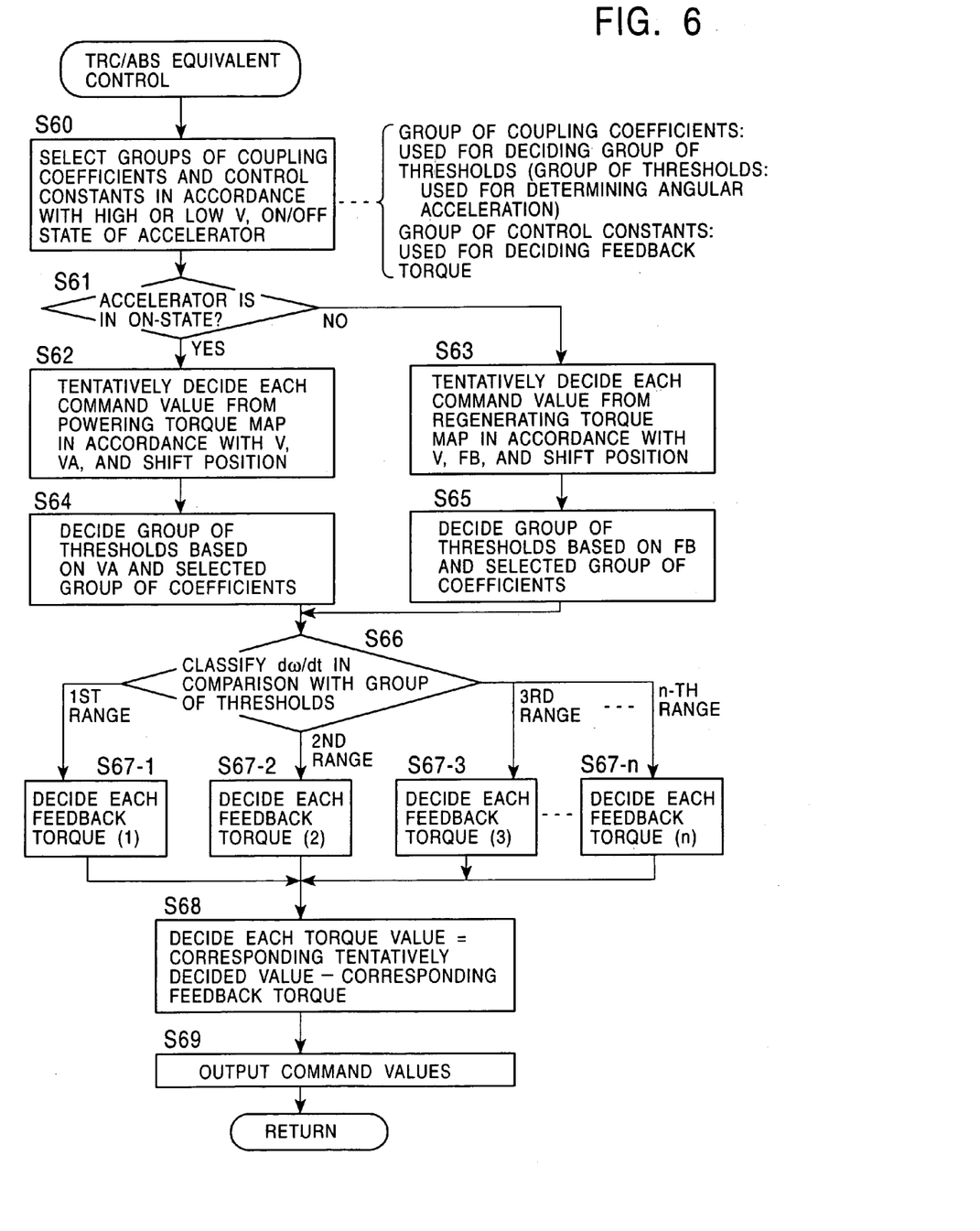
FIG. 6 is a flowchart illustrating the steps of a TRC/ABS equivalent control according to the embodiment of the present invention.

An example sequence of the TRC/ABS equivalent control is shown in FIG. 6.

In order to perform the TRC/ABS equivalent control, the car controller 1 first selects groups of coupling coefficients and control constants, and the like depending on whether the wheel speed V is high or low, whether the accelerator is in an ON-state or OFF-state, and so forth (Step S60).

The groups of coupling coefficients and control constants mentioned above are respectively a group of coefficients used for deciding a group of thresholds used for determining an angular acceleration, which will be mentioned later, and a group of constants used for deciding a feedback torque. The car controller 1 tentatively decide a torque command value from the powering torque map in accordance with the wheel speed V, the accelerator opening VA and the shift position when it is determined in Step S61 that the accelerator is in an ON-state (Step S62) and from the regenerating torque map in accordance with the wheel speed V, the brake force FB and the shift position when it is determined in Step S61 that the accelerator is in an OFF-state (Step S63).

Furthermore, when it is determined that the accelerator is in an ON-state or OFF-state in Step S61, the car controller 1 decides the group of thresholds, respectively, on the basis of the accelerator opening VA and the group of coupling coefficients selected in Step S60 (Step S64) or on the basis of the brake force FB and the group of coupling coefficients selected in Step S60 (Step S65).

The car controller 1 classifies an angular acceleration $d\omega/dt$ of each wheel relative to the group of thresholds decided in Step S64 or S65 (Step S66). The car controller 1 decides feedback torques by using different computing expressions or the like on the basis of the classified results. For example, when the angular acceleration $d\omega/dt$ lies in a first, second, third, - - - , or n-th range, the car controller 1 decides the feedback torque of each wheel by performing a feedback torque process with a first computing expression (Step S67-1), with a second computing expression (Step S67-2), with a third computing expression (Step S67-3), - - - , or with a n-th computing expression (Step S67-n), respectively.

Moreover, constants of the computing expressions used in Steps S67-1, S67-2, S67-3, - - - , S67-n are given by the group of control constants selected in Step S60. The car controller 1 decides torque command values by subtracting the corresponding feedback torques as decided above from the corresponding torque command values tentatively decided in Step S62 or S63 (Step S68) and outputs the decided torque command values to the corresponding motor controllers (Step S69).

Since a torque acting on each drive wheel can be varied if needed by using the above-mentioned sequence, a function equivalent to the TRC/ABS control in a conventional engine-powered car can be achieved. Refer to the disclosures in Japanese Unexamined Patent Application Publications Nos. 8-182119 and 10-210604 with regard to the TRC/ABS equivalent control. Upon completing the sequence shown in FIG. 6, the operation of the car controller 1 advances to Step S4 shown in FIG. 7.

When both the conditions for advancing to the target-yaw-rate adaptive control or the target-slip-angle adaptive control and to the TRC/ABS equivalent control are not satisfied, in other words, when the absolute value of the steering angle δt is less than the corresponding threshold; when the number NS of pairs of slipping wheels forming the tandem suspension structure is 2 or less; and when neither both wheels at the left nor those at the right of the car are slipping wheels, the car controller 1 performs the sequence of the 8-WD control (Step S6).

In order to perform this sequence, the car controller 1 first determines whether the number NS of pairs of the foregoing slipping wheels is 1 or not (Step S13). Since the number NS is equal to zero when traveling on the normal road, the operation of the car controller 1 advances to Step S14 and S15. In Step S14, the car controller 1 decides all drive wheels forming the tandem suspension structure as distribution wheels. The distribution wheel mentioned here means a drive wheel to which a torque output is actually distributed. In step S15, the car controller 1 sets distribution ratios of a torque output to the corresponding distribution wheels at normal values. For example, a distribution ratio equal to 1 is set to all drive wheels. The foregoing distribution ratios may vary in accordance with a load of the car or may be set at predetermined ratios which are different between front and rear wheels in accordance with the structure of the vehicle.

Meanwhile, when it is determined that the number NS is equal to 1 in Step S13, or when it is determined that the conditions for advancing to the TRC/ABS equivalent control are not satisfied in Step 11, the car controller 1 decides wheels other than the pairs of slipping wheels as the distribution wheels (Step S16).

Furthermore, in order to prevent a yaw moment about the center of gravity of the vehicle from acting on the vehicle when the torque is actually output, that is, in order to achieve a lateral balance of the vehicle, the car controller 1 adjusts a distribution ratio of each wheel (Step S17).

For example, the distribution ratio of a pair of the drive wheels which are not selected as distribution wheels in Step S16, that is, a pair of the slipping wheels, is adjusted to be zero so as to prevent the pair of wheels from being provided with torque command values, and the distribution ratio of the pair of non-slipping wheels lying at either one of the right and left sides where the pair of slipping wheels lie is added by the distribution ratio corresponding to the torque output which would otherwise be distributed to the pair of slipping wheels.

Upon performing Step S15 or S17, the car controller 1 tentatively decides a torque command value from the powering torque map in accordance with the vehicle speed VS, the accelerator opening VA, and the shift position when the accelerator is in an ON-state (Step S19) and from the regenerating torque map in accordance with the vehicle speed VS, the break force FB, and the shift position when the accelerator is in an OFF-state (Step S20).

Upon performing Step S19 or S20, the car controller 1 adjusts the torque command value of each pair of wheels tentatively decided in Step S19 or S20 in accordance with the corresponding distribution ratio previously set or adjusted in Step S15 or S17 (for example, multiplying the tentatively decided value by the distribution ratio) so as to decide a torque command value of the pair of wheels (Step S21).

The car controller 1 outputs the torque command values decided in Step S21 to the corresponding motor controllers (Step S22), and then the operation thereof advances to Step S4.

Accordingly, in this embodiment, the control state of the car is changed over in accordance with the slipping state of each wheel forming the tandem suspension structure. First, two wheels forming the tandem suspension structure are regarded as one unit. When only one unit of four units of wheels slips, that is, when the relationship NS=1 holds, the torque command value which would otherwise be output to these slipping wheels is output to the other drive wheels lying at the same side as the slipping wheels. Likewise, when the relationship NS=2 holds and also one unit of slipping wheels lies at each of the right and left sides, a torque command value is output to a unit of non-slipping wheels remaining at each of the right and left sides. In addition, when the relationship NS=2 holds and also both units of slipping wheels lie at the left (or right) side, the TRC/ABS equivalent control is performed. Furthermore, when the relationship NS=3 or NS=4 holds, the TRC/ABS equivalent control is also performed. As described above, according to this embodiment, since the car controller 1 changes over or varies a control mode of each motor output or a torque distribution ratio of each wheel in accordance with the occurrence condition of slipping or the slipping tendency of the wheel, in particular, with the number of units of slipping wheels and the locations thereof, the 8-WD control and the TRC/ABS equivalent control suitable for use in an 8 wheel-drive electric car of an in-wheel motor type are realized, and the running stability of the vehicle can be maintained and improved.

(3) Fail Safe Mechanism

Since the main electronic control unit is internally connected through the control-signal-use, alternative main transmission line CR as mentioned above, even when the transmission lines and the like malfunction, the electric control unit backs up the control system, thereby performing necessary controls as usual.

Figure 3:
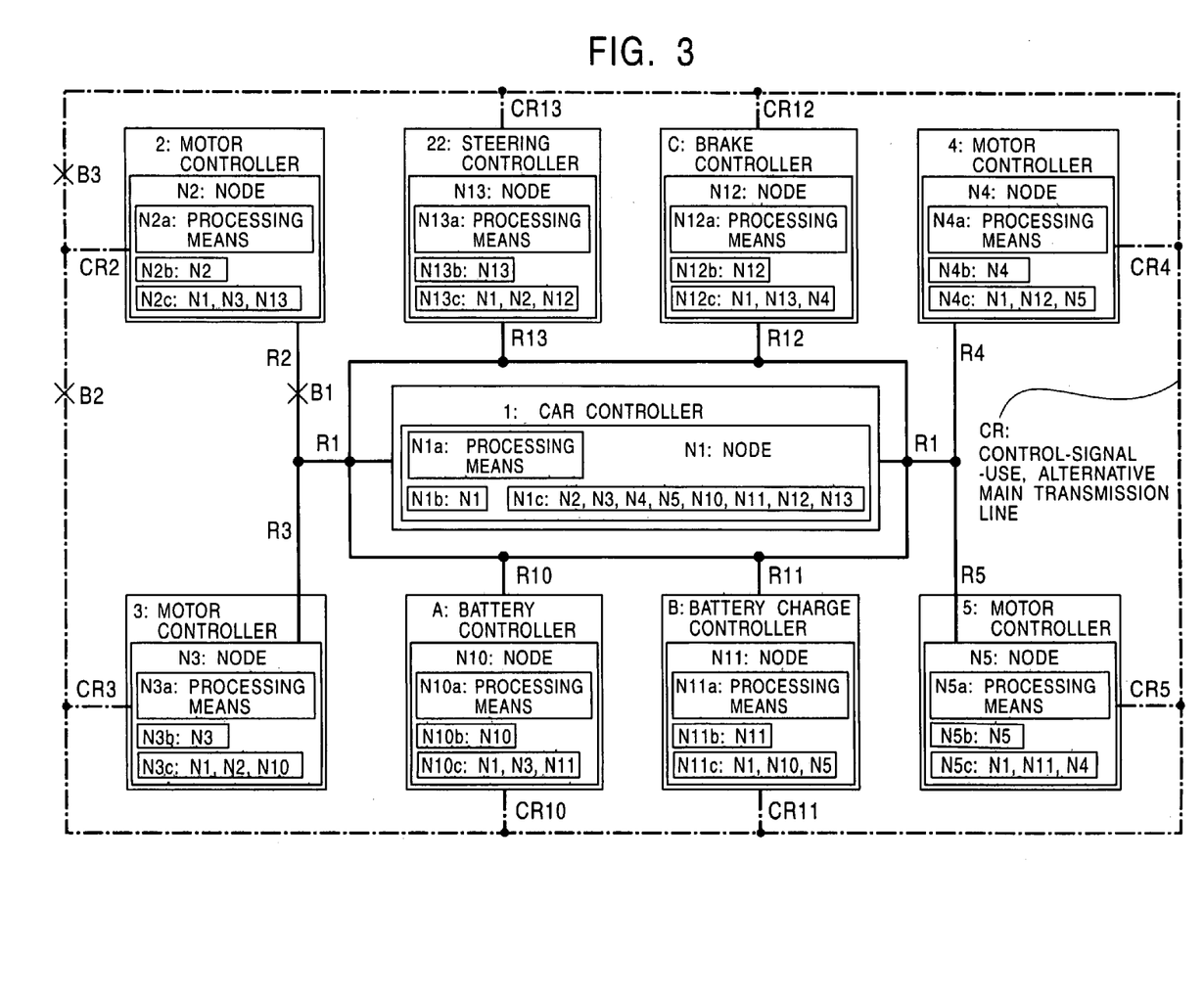
FIG. 3 is a block diagram of an electronic control system of the electric car according to the embodiment of the present invention.

A signal transmission system is formed by nodes (communication devices) installed at the car controller 1, the motor controllers 2, 3, 4, and 5, the battery controller A, the battery charging controller B, the brake controller C, and the steering controller 22, all forming the electronic control unit as shown in FIG. 3. The nodes (communication devices) are formed by a plurality of nodes N1, N2, N3, N4, N5, N10, N11, N12, and N13 respectively having self-node-ID storing means N1$b$, N2$b$, N3$b$, N4$b$, N5$b$, N10$b$, N11$b$, N12$b$, and N13$b$ for storing corresponding self-node identifiers N1, N2, N3, N4, N5, N10, N11, N12, and N13; adjacent-node-ID storing means N1$c$, N2$c$, N3$c$, N4$c$, N5$c$, N10$c$, N11$c$, N12$c$, and N13$c$ for storing identifiers of corresponding adjacent nodes connected to the corresponding transmission lines and alternative transmission lines; and processing means N1$a$, N2$a$, N3$a$, N4$a$, N5$a$, N10$a$, N11$a$, N12$a$, and N13$a$ for processing corresponding route setting in accordance with messages sent to the corresponding nodes and are also formed by the transmission lines R1, R2, R3, R4, R5, R10, R11, R12, and R13, the alternative transmission lines CR2, CR3, CR4, CR5, CR10, CR11, CR12, and CR13, and the control-signal-use, alternative main transmission line CR for connecting the above nodes so as to establish an bypass-route setting method by which a communication route is set so as to bypass a failed location.

According to the foregoing bypass-route setting method, when there is no response to the polling between adjacent nodes through the transmission lines and the alternative transmission lines connected to the corresponding nodes, it is regarded that a communication failure is detected on the transmission lines or the alternative transmission lines between the two nodes; the node which detected the communication failure sends a search message s including its self-identifier and the identifier of the adjacent node connected to the transmission lines on which the communication failure was detected; the node which received the search message compares the identifier ID of the adjacent node in the search message with identifiers stored in its self-node ID storing means and its adjacent node ID storing means; and, when all the above comparisons do not result in a coincidence with each other, the node which received the search message relays the search message to other nodes, and when any one of the above comparisons results in a coincidence with each other, the node which received the search message sends back a response message r for setting a bypass-route to the node which detected the communication failure.

Data including a message type such as a search message or a response message, an identifier (ID) of a receiving communication device, an identifier (ID) of a sending communication device, an identifier (ID) of a malfunction-related communication device, and a remaining line capacity is written in a control section of a sending signal frame of the search message s or the response message r, respectively. The malfunction-related communication device means a malfunctioning communication device or an adjacent communication device connected to a malfunctioning transmission line.

When each node detects that a transmission line between the node N1 of the car controller 1 and the node Nn of the corresponding motor controller is established, the node sets its own motor controller and inverter in a standby mode. Upon receiving a control command via the transmission lines, the motor controller controls the corresponding inverter in accordance with the control command.

[Case (a)]

An example case where a communication failure B1 occurs on the signal transmission line R2 between the car controller 1 and the motor controller 2 will be described with reference to FIGS. 2 and 3.

In accordance with the polling between the node N2 and the adjacent node N1 via the transmission line and the alternative transmission line connected thereto, the node N2 detects that a communication failure occurs when no response comes from the opposing node. The processing means N2a of the node N2 sends data, which includes information that a message type is a search message s, an identifier of the sending communication device is N2, and an identifier of the malfunction-related communication device is N1 and which is written in a control section of the corresponding signal frame, to the node N13 or N3.

(a-1) The setting of a bypass route via the node N3 will be first described. Upon receiving the search message s, with the processing means N3a, the node N3 reads the identifier N1 of the malfunction-related node from the search message and compares the identifier N1 with the data N3 stored in the self-node-ID storage N3b and the data N1, N2, and N10 stored in the adjacent-node-ID storage N3c. As a result of these comparisons, since the identifier N1 coincides with the data N1 stored in the adjacent-node-ID storage N3c, the node N3 sends a response message r to the node N2 so to establish an alternative transmission line between the nodes N2 and N1, that is, to connect the alternative transmission line CR2, the alternative main transmission line CR, the alternative transmission line CR3, the node N3, the transmission line R3, and the transmission line R1 in that order, and also sends a route setting signal to its own route change section, instructing for setting a bypass route to the node N2 via the node N3 in place of the communication route to the node N2 via the transmission line R2.

The response message r is a sending signal including information that a message type is a response message, an identifier of the receiving node is N2, and an identifier of the sending node is N3, the information being written in a control section of the corresponding signal frame.

Meanwhile, upon receiving the response message r, the node N2 reads information that the identifier of the sending communication device is N3; checks an opposing node to which a bypass route is to be set on the basis of this information; and sends a route setting signal to its own route changing section, instructing for setting a bypass route to the node N3 in a similar fashion to that in the above-mentioned embodiment.

(a-2) The setting of a bypass route via the node N13 will be described.

In a similar sequence to that described in the above-mentioned (a-1), a bypass route connecting the alternative transmission line CR2, the alternative main transmission line CR, the alternative transmission line CR13, the node N13, the transmission line R13, and the transmission line R1 in that order is formed.

The bypass routes in accordance with the foregoing route setting signals are set.

[Case (b)]

Another example case where the communication failure B1 occurs on the signal transmission line R2 between the car controller 1 and the motor controller 2 and another communication failure B2 occurs on the alternative main transmission line CR will be described with reference to FIGS. 2 and 3.

In this case, only the bypass route described in the above-mentioned (a-2) can be set, while the bypass route described in the above-mentioned (a-1) cannot be set.

[Case (c)]

Another example case where the communication failure B1 occurs on the signal transmission line R2 between the car controller 1 and the motor controller 2 and the communication failure B2 and another communication failure B3 occur on the alternative main transmission line CR will be described with reference to FIGS. 2 and 3.

In this case, since there was no response to the polling in a predetermined time period, the node N2 detects the fact that the node N2 has lost all transmission lines to the car controller 1 due to the occurrences of the communication failures B1, B2, and B3, and hence changes the mode of the motor controller 2 from a standby mode to a stop mode so as to stop the inverters 10 and 10'.

The car controller 1 detects the fact that there is no response from the node N2 in a predetermined time period, disconnects the node N2 from the transmission lines, and then controls the remaining motor controllers by backing up them via the remaining nodes.

A bypass route between the car controller 1 and each of the controllers 2, 3, 4, 5, 10, 11, 12, and 13 is set in a similar fashion to that in the above mentioned embodiment.

As described above in detail, the present invention offers the following advantages.

(1) In an electric car of a type in which each drive wheel is independently driven, employing an electronic control for improving its running stability having a wheel system suspended by a tandem wheel suspension, and equipped with an in-wheel drive system in which electronically controlled motors are incorporated into all wheels, even when a certain electronic control system malfunctions the car can keeps its control operation while maintaining its control functions by setting a bypass route.

(2) Since a fail safe mechanism is incorporated into an electronic control system, a stable car control can be performed. More particularly, in an electric car of a type in which each drive wheel is independently driven, having a wheel system suspended by a tandem wheel suspension and equipped with an in-wheel drive system in which electronically controlled motors are incorporated into all wheels, since a control for improving the running stability of the car is employed, a load on each wheel can be reduced and a TRC or ABS equivalent control commensurate with the reduction in load can be performed, thereby leading to a reduced risk of slipping and the like and improving the running stability. Also, since the electronic control system is constructed such that an output torque value is directed to each motor after the output torque values are adjusted so as to prevent a new yaw moment from acting on the vehicle when at least one pair of non-slipping wheels exist at each of the right and left of the vehicle, a 8-WD system is achieved while preventing a yaw moment from occurring and a reliable running-stability control under slipping is achieved.

(3) Since a fail safe mechanism is incorporated into an electronic control system, a stable car control can be performed. More particularly, in an electric car of a type in which each drive wheel is independently driven, having a wheel system suspended by a tandem wheel suspension and equipped with an in-wheel drive system in which electronically controlled motors are incorporated into all wheels, a control for improving the running stability of the car is employed, thereby leading to a reduced risk of slipping and the like and improving the running stability. Also, since the electronic control system is constructed such that an output torque value is directed to each motor after the output torque value is adjusted in accordance with the slipping state of the corresponding slipping wheel when no pair of non-slipping wheels exist at each of the right and left of the vehicle, a TRC/ABS equivalent control is achieved without a member for operating a pressure of a brake fluid, and also since the TRC/ABS equivalent control operates under appropriate circumstances, a reliable running-stability control under slipping is achieved.

INDUSTRIAL APPLICABILITY

Since a control device of an electric car according to the present invention performs an accurate control between controllers fixed to corresponding electric motors, it is especially suitable as a control device of that which does not emit an exhaust gas affecting on global warming.

The invention claimed is:

1. A control device of an electric car including plurality of driving wheels, each having a drive motor fixed thereto,
   wherein the plurality of driving wheels are eight wheels, each having a drive motor fixed thereto, the control device comprising: a plurality of speed control devices, each fixed to the corresponding drive motor for accelerating or decelerating the corresponding driving wheel in accordance with an external electrical signal; and a main control device having functions of sending a control signal, to each of the speed control devices, for performing an acceleration or deceleration in accordance with a command from a driver or at least one of on-board sensors, and also receiving a control signal including information of an operating state of each of the drive motors and the speed control devices; and
   wherein the control device comprising fail safe means which outputs the control signal from the main control device to the driving motors, each disposed on the eight-wheel drive wheels, via transmission lines, alternative transmission lines, and a control-signal-use, alternative main transmission line.

2. The control device of an electric car according to claim 1, wherein a voltage of a battery, a current fed from the battery, and a battery temperature are included as sensor signals which are input into the main control device.

3. The control device of an electric car according to claim 1, wherein a steering-angle of a steering wheel is included as a sensor signal which is input into the main control device.

4. The control device of an electric car according to claim 1, wherein a signal indicating that a battery is being recharged from a battery charger is included as a sensor signal which is input into the main control device.

5. The control device of an electric car according to claim 1, wherein signals representing a brake command value from a brake controller and a hydraulic pressure of a master cylinder are included as sensor signals which are input into the main control device.

6. The control device of an electric car according to claim 1, wherein a steering-angle signal of a steering wheel is included as a control signal sent from the main control device.

* * * * *